June 2, 1959

J. M. KOZLOVIC ET AL 2,889,433

CIRCUIT INTERRUPTERS

Filed Nov. 26, 1956

10 Sheets-Sheet 1

WITNESSES
Robert C Baird
Wm. C. Groome

INVENTORS
John M. Kozlovic &
Russell E. Frink.
BY
Willard R. Crout
ATTORNEY

June 2, 1959 J. M. KOZLOVIC ET AL 2,889,433

CIRCUIT INTERRUPTERS

Filed Nov. 26, 1956 10 Sheets-Sheet 2

June 2, 1959 J. M. KOZLOVIC ET AL 2,889,433

CIRCUIT INTERRUPTERS

Filed Nov. 26, 1956 10 Sheets-Sheet 10

United States Patent Office
2,889,433
Patented June 2, 1959

2,889,433

CIRCUIT INTERRUPTERS

John M. Kozlovic, Greensburg, and Russell E. Frink, Forest Hills, Pa., assignors to Westinghouse Electric Corporation, East Pittsburgh, Pa., a corporation of Pennsylvania Application November 26, 1956, Serial No. 624,354

12 Claims. (Cl. 200—144)

This invention relates to circuit interrupters in general, and more particularly, to arc-extinguishing structures therefor.

A general object of the invention is to provide an improved circuit interrupter, which will be able to quickly extinguish the arcs associated with very high fault currents.

Another object of the invention is to provide an improved circuit interrupter of the magnetic air-break type, which will have an interrupting structure suitable for the very fast clearing of fault currents.

Another object of the invention is to provide an improved arc-extinguishing structure for a circuit interrupter, which will effectively confine the established arc and prevent any flashover externally of the arc chute.

In United States Patent 2,276,859, issued March 17, 1942 to Robert H. Nau, and assigned to the assignee of the instant application, there is illustrated and described a magnetic air-break arc chute having a centrally disposed widened exhaust passage, or chimney, disposed intermediate the ends of the spaced plate stack structure. It has been discovered that a remarkable increase of interrupting ability is attained by utilizing instead of only one chimney, as described by Nau, a plurality of such chimneys, or exhaust passages, spaced a short distance apart along the stack structure. It has been discovered that by the use of many such exhaust passages, that the arc column is quickly moved upwardly in the arc chute, and spaced portions of the arc column, at the widened chimney passages, are cooled, and loop somewhat upwardly in the chimney passages, thereby providing a plurality of spaced, stabilizing portions along the arc column. Thus, an unusual advantage is obtained by the use of many such widened chimney passages along the arc chute stack, instead of employing only one, as taught by Nau.

It is, therefore, a further object of the present invention to provide an improved arc chute of the spaced-plate type, in which a plurality of enlarged chimney passages are spaced along the length of the stacked plate arc chute.

Another object of the invention is to provide an improved arc chute composed of such parts of suitable configuration that the assembly and disassembly time may be considerably reduced.

Still a further object of the invention is to associate improved cooling structures over the ends of the arc horns, associated with the arc chute, to prevent the emission of ionized gas out of the ends of the arc chute.

Yet a further object of the invention is to provide an improved arc chute having a chute jacket assembled from flat insulating plates and end channels, rather than utilizing a formed tube, which latter construction has been customary heretofore.

Another object of the invention is to provide chimney extensions projecting beyond the outer end of the arc chute.

Still a further object of the invention is to provide a chimney construction disposed at the outer end of the arc chute, which may additionally serve as a deflecting means to prevent the concentration of ionized exhaust gases out of the end of the arc chute.

Still a further object of the present invention is to provide an improved arc chute having a plurality of deflecting members disposed at the exhaust end of the arc chute. Preferably such deflecting members are sealed to the exhaust ends of the plates by a considerable sealed contact area between such deflecting members and the upper side surfaces of the arc chute plates.

Although the invention will be particularly described in connection with an arc chute, which is assembled from a plurality of spaced plate portions, spaced apart by spacing strips, such as asbestos rope, placed along the side edges of the plate portions, it is to be clearly understood that certain features of the invention may readily be incorporated in an arc chute of the interleaving fin type, in which one side wall member has a plurality of fin portions integrally formed therewith, which interleave with the cooperating fin portions, which are integrally formed with the cooperating opposite side wall member.

An additional object of the invention is to provide an improved structure for obtaining an effective gas seal between one or more deflecting angles and the exhaust end of an arc chute.

Further objects and advantages will readily become apparent upon reading the following specification, taken in conjunction with the drawings, in which.

Figure 1:
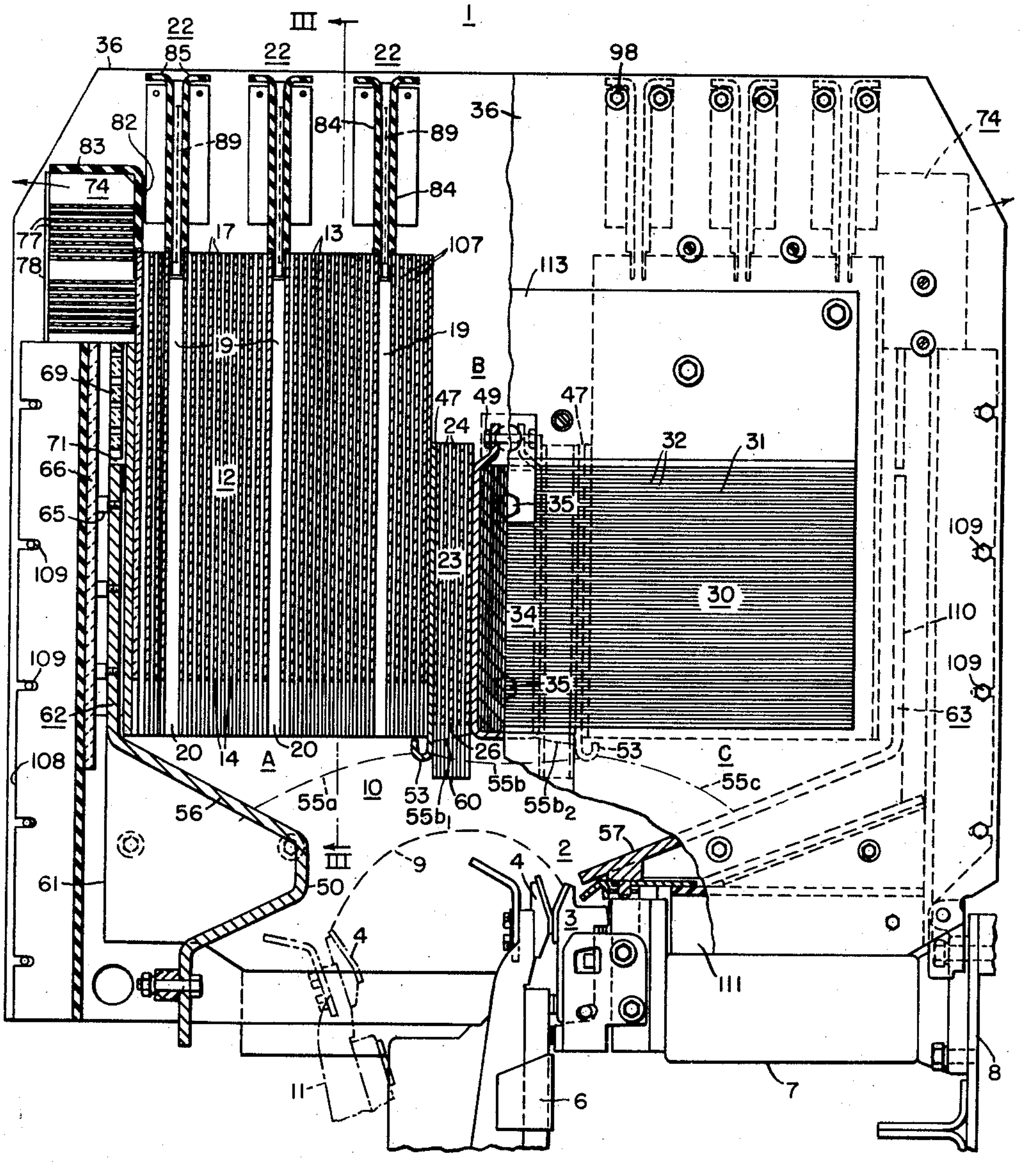
Figure 1 is an side elevational view, partially in vertical section, of an arc chute embodying the present invention with the contact structure being shown in the closed-circuit position.

Referring to the drawings, and more particularly to Fig. 1 thereof, the reference numeral 1 generally designates a circuit interrupter, embodying the principles of the present invention, and comprising contact structure 2, which includes a relatively stationary contact 3 and a cooperable movable contact 4. Preferably the movable contact 4 is disposed at the outer, free end of a contact arm 6, which is rotatable about a lower fixed pivot not shown. The relatively stationary contact 3 is situated at the outer end of a terminal bushing 7, which may be suitably supported upon a frame 8 composed of structural steel members.

Certain features of the contact structure 2 are set out and claimed in United States patent application filed July 31, 1956, Serial No. 601,259, now United States Patent 2,849,579, issued August 26, 1958 to Russell E. Frink, and assigned to the assignee of the instant application.

During the opening operation, the mechanism, associated with the contact structure 2, is operated, and thereby effects a counterclockwise rotative motion of the contact arm 6 about its pivot, not shown, thereby establishing an arc 9 between the contacts 3 and 4. The partially open-circuit position of the movable contact 4 is indicated by the dotted position 11 of Fig. 1.

The arc 9, established between the relatively stationary contact 3 and the movable contact 4, is moved upwardly within an arc-chute structure, generally designated by the reference numeral 10.

Generally, the arc-chute structure 10 includes three portions A, B and C. The arc-chute sections A and C are formed of unitary, cemented, spaced-plate stack portions 12, more clearly shown in Figs. 23 and 24 of the drawings. Each stack structure 12 includes a plurality of spaced, slotted, ceramic, non-gas-evolving, insulating plates 13, the configuration of which is more apparent from a study of Fig. 24 of the drawings. The plates 13 have closed, tapered slots 14 provided therein, the upper closed ends of which 15 are off-center from the center line 16 of the stack structure 12.

During assembly, the plates 13 are alternately stacked, so that the closed ends 15 of the slots 14 are first on one side of the center line 16 of the stack structure 12, and then on the other side. Sections of asbestos rope 17 are employed to space the plates 13 a relatively small distance apart. The sections of asbestos rope 17 are disposed along the plates 13 in the manner illustrated in Fig. 24, and are cemented to the plates 13. Following the assemblage of the ceramic plates 13, the stack structure 12 is baked, so as to constitute a unitary assemblage, which may be bodily inserted within the arc-chute structure 10.

Figures 20, 21, 22, 23, 24:
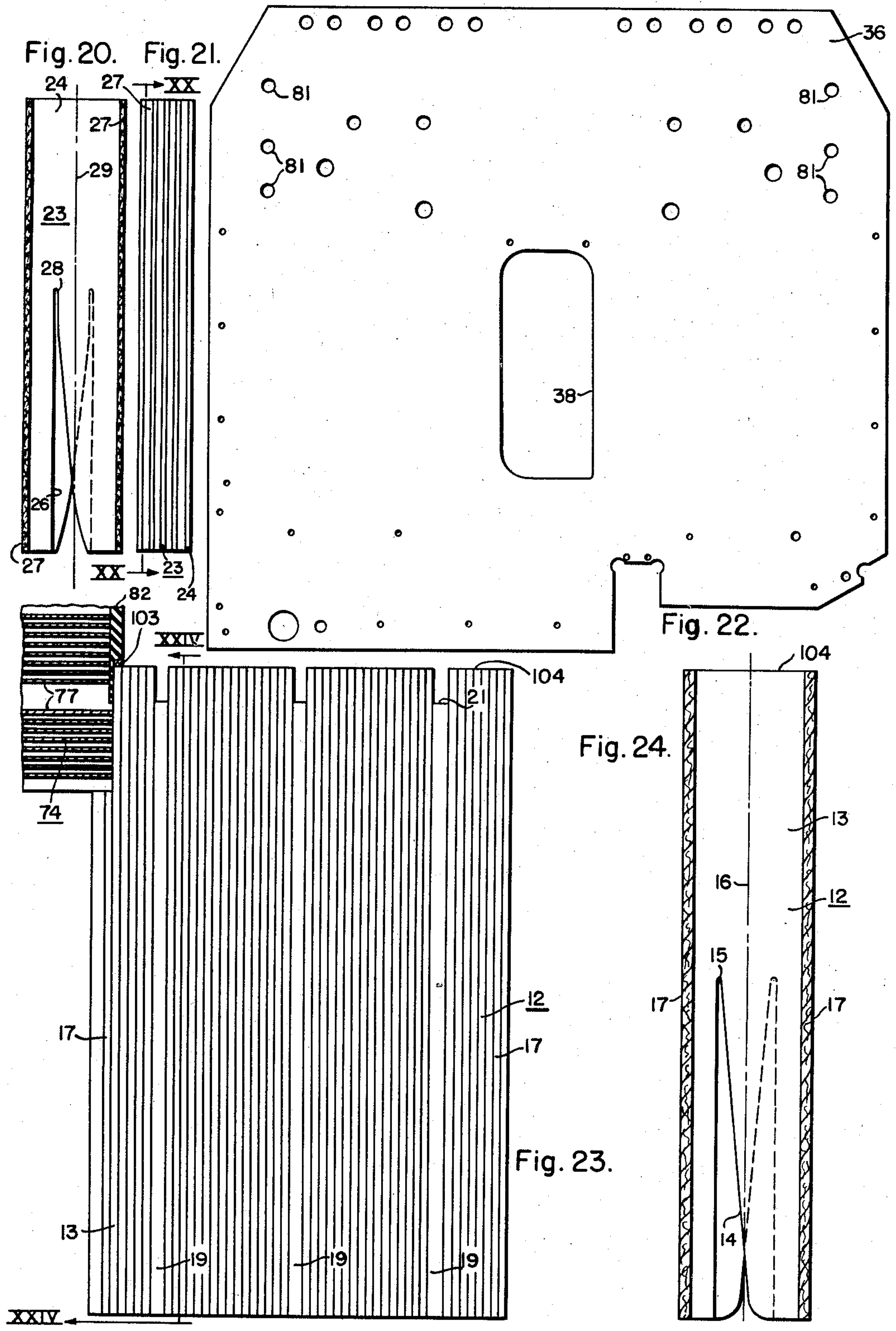
Fig. 20 is a sectional view taken along the line XX—XX of the transfer stack illustrated in Fig. 21, looking in the direction of the arrows.
Fig. 21 is a side elevational view of the cemented, transfer stack.
Fig. 22 is a considerably reduced view of one of the side housing plates, utilized in the assembly of the arc chute of Fig. 1.
Fig. 23 illustrates a side elevational view of one of the cemented, main, spaced-plate stack structures, showing for purposes of illustration, a fragmentary portion of one of the cooling assemblies, which are disposed over the arc-horn assemblies.
Fig. 24 is a sectional view taken along the line XXIV—XXIV of the main stack structure of Fig. 23, looking in the direction of the arrows.

It has been discovered that an unusual, marked increase of interrupting ability is obtained for the spaced-plate stack structure 12, by utilizing at several spaced portions along the stack structure 12 relatively wide, insulating, spacing strips 19, shown in Fig. 23, which are substituted for the asbestos-rope sections 17. In practice, these insulating, relatively wide, spacing strips 19 may be almost four times as wide as the width of the asbestos-rope sections 17, and thereby provide a plurality of enlarged chimney passages 20, spaced along the stack structure 12 in the manner more clearly illustrated in Fig. 1 of the drawings.

It has been discovered that the use of many such enlarged chimney passages 20 results in very fast movement of the arc upwardly within the stack structure 12, and, in addition, permits the ready venting of ionized gases out of the arc chute 10, with the result that greatly improved performance of the circuit interrupter 1, as a whole, is obtained.

The spacing strips 19 have their upper ends shortened, as at 21 in Fig. 23, to accommodate chimney extension structures 22, more fully described hereinafter.

The central portion B of the arc chute 10 includes a pair of spaced-plate transfer stacks 23, more fully shown in Figs. 20 and 21 of the drawings. Each of the transfer stacks 23 is assembled from a plurality of non-gas-evolving, ceramic plates 24, each having a slot 26 therein, and of a shape generally similar to the plates 13 of the stack structure 12. Again asbestos-rope sections 27 are employed to space the plates 24 a relatively small distance apart, and the closed ends 28 of the slots 26 are again staggered during the assembly operation about the center line 29 of the transfer stack 23. The asbestos-rope sections 27 are cemented to the plates 24, so that again a cemented unitary stack structure 23 results.

Figures 32, 33, 34:
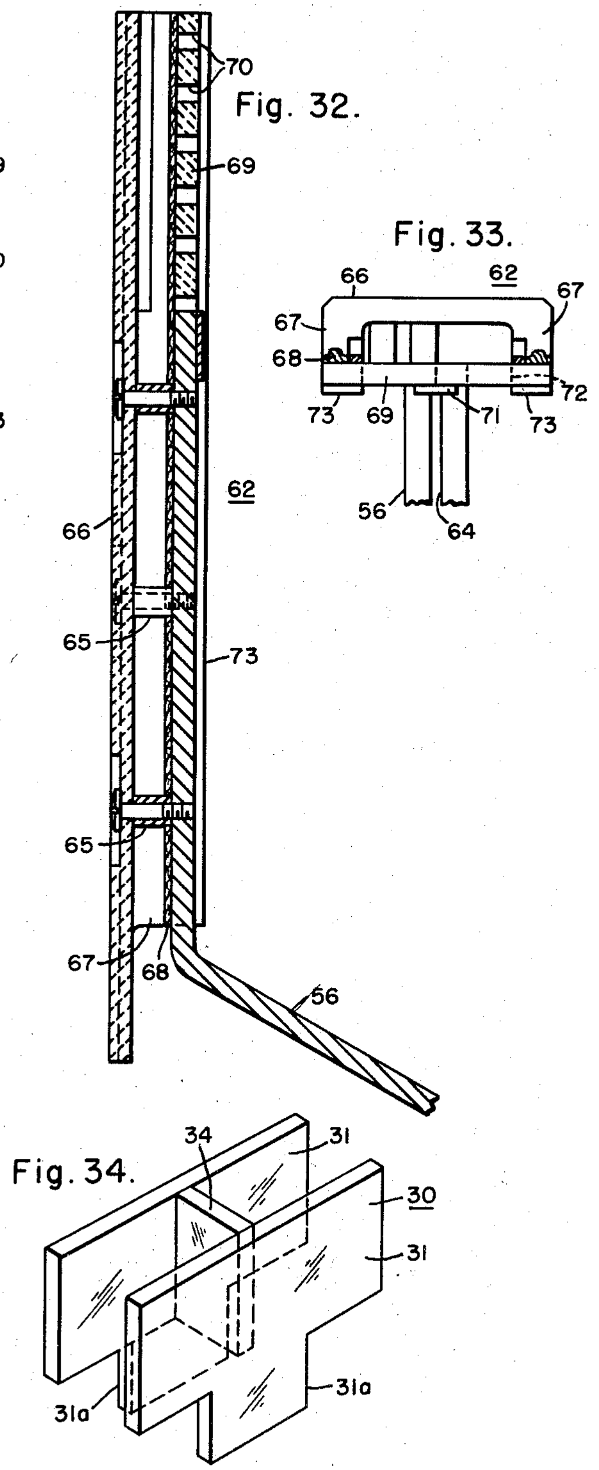
Fig. 32 is a sectional view taken along the line XXXII—XXXII of the arc-horn assembly of Fig. 31.
Fig. 33 is a top plan view of the arc-horn assembly of Fig. 31, with part of the arc horn broken away.
Fig. 34 is a perspective view of the magnetic structure for the arc chute of Fig. 1, drawn to a reduced scale.

The magnetic structure 30 for the arc chute 10 is of generally H-shape, as illustrated in perspective in Fig. 34 of the drawings. With reference to this figure, it will be noted that a pair of side pole plates 31 are utilized, each of which is assembled from a plurality of magnetic strips 32 (Fig. 3), which are riveted together, as by rivets 33. Interconnecting the pole plates 31 is an interconnecting yoke portion 34 (Fig. 34), which may be bolted to the pole plates 31 by mounting bolts 35, as shown in Fig. 1.

Figures 35, 36:
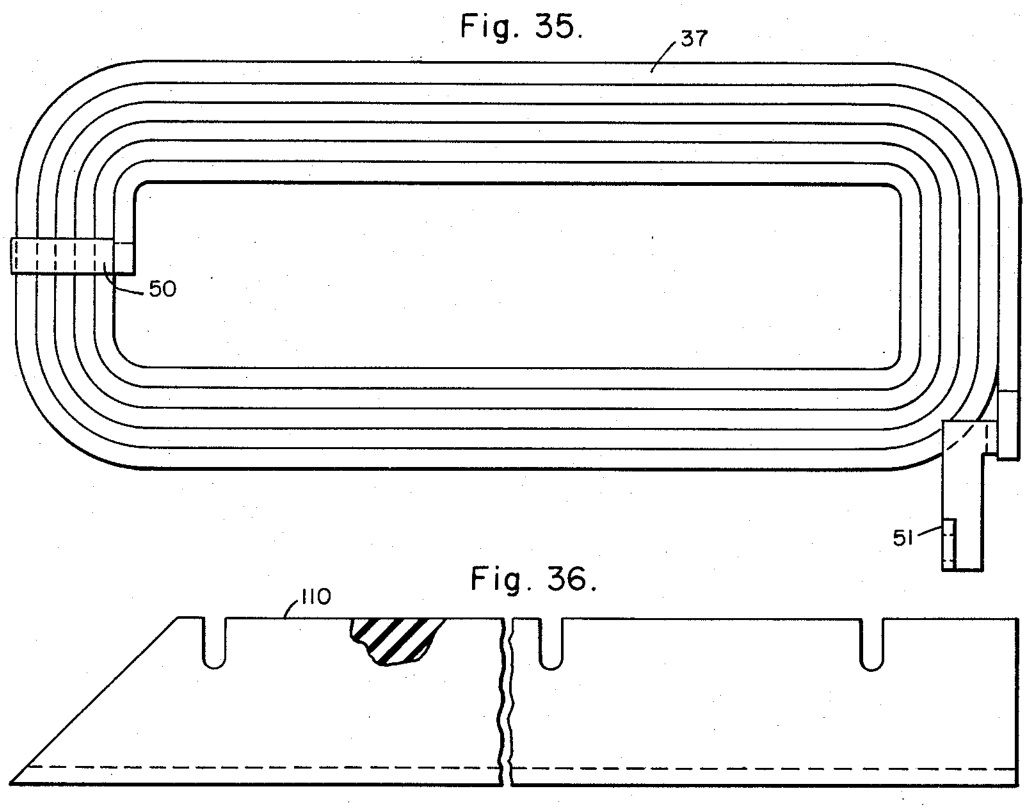
Fig. 35 is an enlarged, side view of one of the pancake, center coils used in the arc chute of Fig. 1.
Figs. 36–38 are side elevational views of insulating channels used for the housing of the arc chute of Fig. 1; and, Fig. 39 is an end elevational view of the mounting channel of Fig. 37, taken along the line XXXIX—XXXIX of Fig. 37.
Figure 37:
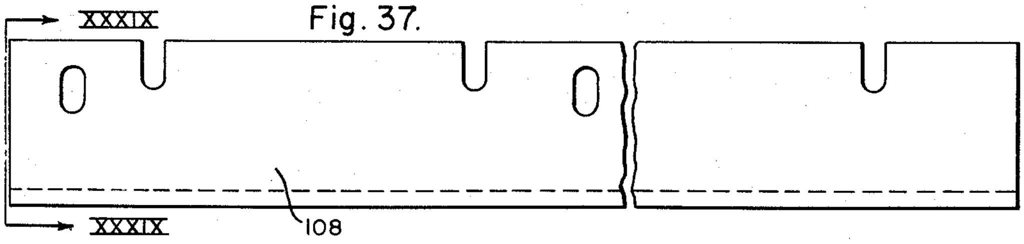

In the assembly of the arc chute 10, first one takes a pole plate 31 and the yoke, or core 34, which is bolted thereto by the mounting bolts 35. One of the side housing insulating plates 36, more clearly illustrated in Fig. 22, is then placed over the core 34. A pancake-shaped center coil 37, more clearly shown in Fig. 35, is then placed over the core 34, and inside of a substantially rectangularly-shaped opening 38 in the insulating side plate 36, so as to be braced by the periphery of the hole 38. This particular feature is set out, and claimed in United States Patent No. 2,769,065, issued October 30, 1956, to Russell E. Frink, and assigned to the assignee of the instant application.

Figure 19:
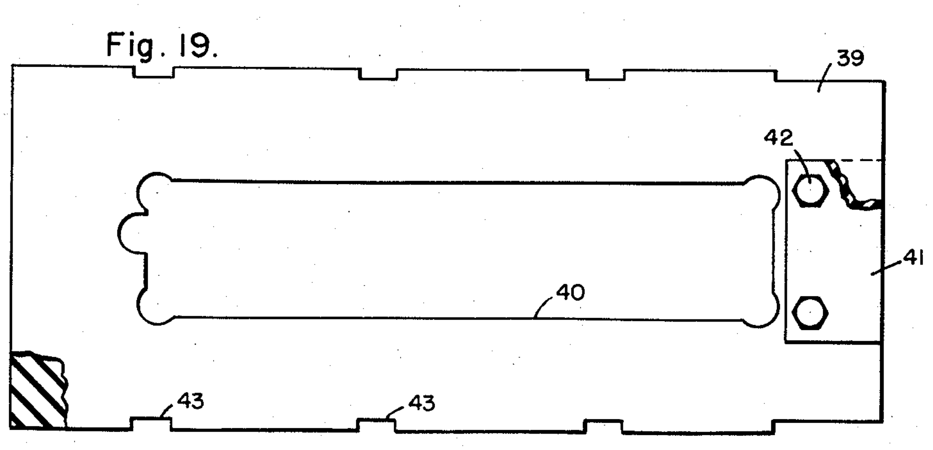
Fig. 19 is a plan view of an assembled, insulating coil washer.

Following the assembly of a center coil 37, an insulating coil washer 39, more clearly shown in Fig. 19, is assembled over the core 34, with the latter protruding through a rectangularly-shaped opening 40 in the coil washer 39. The insulating coil washer 39 has an insulating reenforcement plate 41 bolted thereto, by bolts 42, for a purpose explained hereinafter. Also the insulating coil washer 39 has a plurality of notches 43 provided along the side edges thereof for a purpose explained hereinafter.

Figures 25, 26, 27, 28, 29, 30:
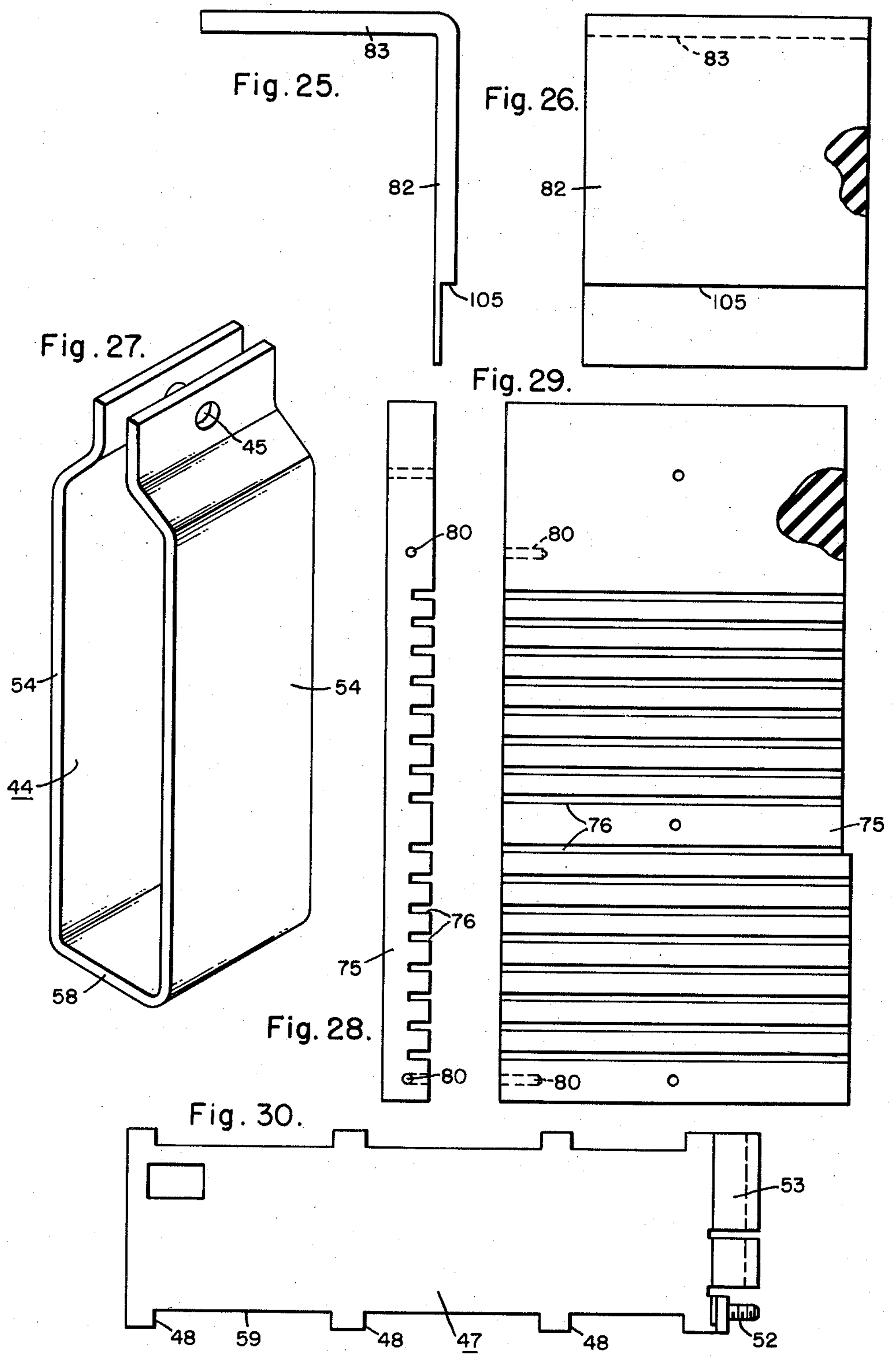
Fig. 25 is a side elevational view of one of the deflecting angles, which is disposed over each arc-horn assembly.
Fig. 26 is an end elevational view of the deflecting angle illustrated in Fig. 25.
Fig. 27 is a perspective view of the shading coil used around the magnetic yoke of the arc chute of Fig. 1.
Fig. 28 is an end elevational view of one of the grooved, mounting plates for the end cooler assemblies.
Fig. 29 is a side elevational view of the grooved mounting plate of Fig. 28.
Fig. 30 is a side view of one of the center arc horns of the arc chute of Fig. 1.

The yoke 34 has previously been wrapped with a rectangular strip of heavy paper, and a shading coil 44, shown in perspective in Fig. 27, is slipped over the core 34 and the aforementioned paper wrapping, not shown. As illustrated in Fig. 27, the shading coil 44 has a pair of mounting holes 45 disposed at its upper end for a purpose described hereinafter. A pair of center arc horns 47, more clearly shown in Fig. 30, and having lugs 48, are then assembled with the aforementioned coil washer 39 and a second coil washer 39, so that the lugs 48, integrally formed with the center arc horns 47, will fit into the notches 43 of the insulating coil washers 39, to form a generally box-shaped arrangement with the core 34 passing centrally through the box. A terminal bolt 49 (Fig. 1) passes through the two mounting holes 45 of the shading coil 44 (Fig. 27), and bolts the upper terminals 50 of the two pancake-shaped center coils 37 (Fig. 35) fixedly in place. The other terminals 51 of the two pancake-shaped center coils 37 are secured by nuts, not shown, to a threaded stud 52, brazed to the lower curved end 53 of the center arc horns 47, as illustrated in Fig. 30 of the drawings. Thus, there exists a circuit between the two center arc horns 47 through the two center coils 37, disposed in electrical series by the mounting bolt 49. Reference may be had to United States Patent 2,795,675, issued June 11, 1957, to Russell E. Frink for general features of the pancake, center coil construction together with a shading coil and transfer stack arrangement.

Between each outer side 54 (Fig. 27) of the shading coil 44 and the rear side of each center arc horn 47 is positioned a unitary cemented transfer stack 23, as shown in Fig. 21. Thus, the initially established arc 9, moving upwardly because of the loop circuit including the upper terminal bushing 7, the lower terminal bushing, not shown, and the rotatable moving contact arm 6, contacts the two center arc horns 47 at the lower curved portions 53 (Fig. 30) thereof. The initially established arc 9 may now be considered to be divided into three portions, namely, arc portion **55*a* extending between the front arc horn 56 and the front center arc horn 47, an intermediate arc portion 55*b* extending between the lower ends 53 of the two center arc horns 47, and a third arc portion 55*c* extending between the rear center arc horn 47 and the rear arc horn 57 of the arc chute 10**, as indicated in Fig. 1 of the drawings.

The intermediate arc portion **55*b* moves upwardly against the lower surface 58 (Fig. 27) of the shading coil 44, and since the shading coil 44 is of conducting material, such as bronze, the intermediate arc portion 55*b* will be broken into two sections $55b_1$ and $55b_2$. Each arc portion $55b_1$, $55b_2$ will move upwardly within the slots 26 of the plates 24 constituting the transfer stacks 23, with the ends of the arc portions $55b_1$, $55b_2$ terminating at the back surfaces 59 of the center arc horns 47 and along the outer sides 54 of the shading coil 44**, as shown more clearly in Fig. 1. Reference may be made again to the aforesaid Patent 2,795,675 in this connection.

The arc portions $55b_1$ and $55b_2$ will be quickly extinguished because of the cooling effect of the slotted transfer plates 24, and this will cause the insertion into series circuit of the two serially related center magnetizing coils 37. The energization of the two magnetizing coils 37 generate flux within the magnet structure 30 (Fig. 34), and will result in a transverse magnetic field existing between the pole plates 31 across the main spaced-plate stack portions 12.

This transverse magnetic field will force the arc portions **55*a*, 55*c* upwardly within the slots 14 of the main arcing plates 13, and will bring about the extinction of the arc portions 55*a*, 55*c*** in the manner heretofore described.

Figure 3:
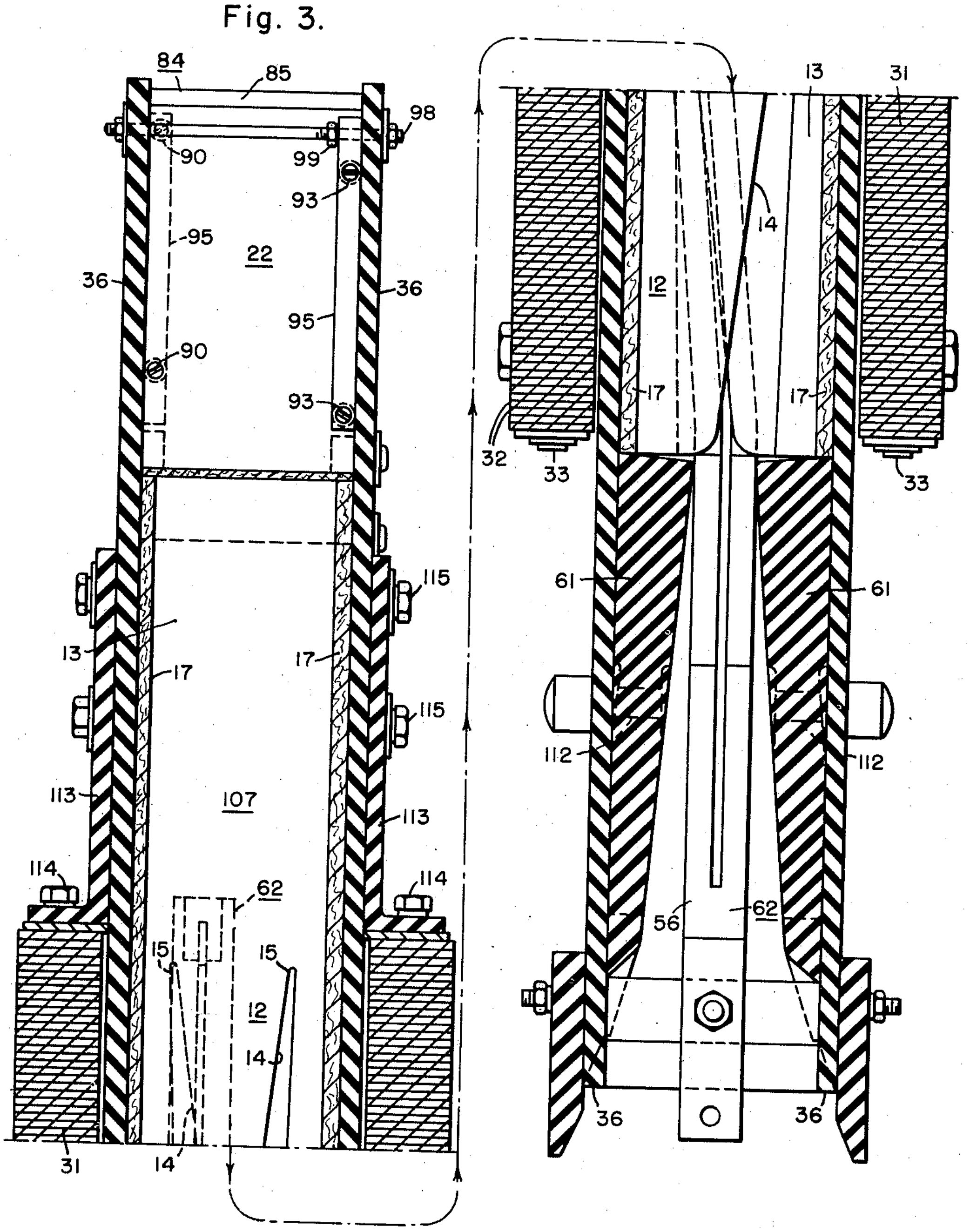
Fig. 3 is a vertical, sectional view taken through the main stack structure of the arc chute of Fig. 1, along the line III—III of Fig. 1, looking in the direction of the arrows.

The transfer stacks 23 rest upon recesses 60 provided by a pair of wedged-shaped, arcing plates 61, more clearly shown in Fig. 3, and providing a tapered arc passage, which assists in guiding the arc 9 upwardly within the arc-chute structure 10. The reenforcing plates 41 bolted to the inside surfaces of the coil washers 39 additionally protect the center coils 37 from the intermediate arc portion **55*b*** and form a support for the transfer stacks.

Figure 31:
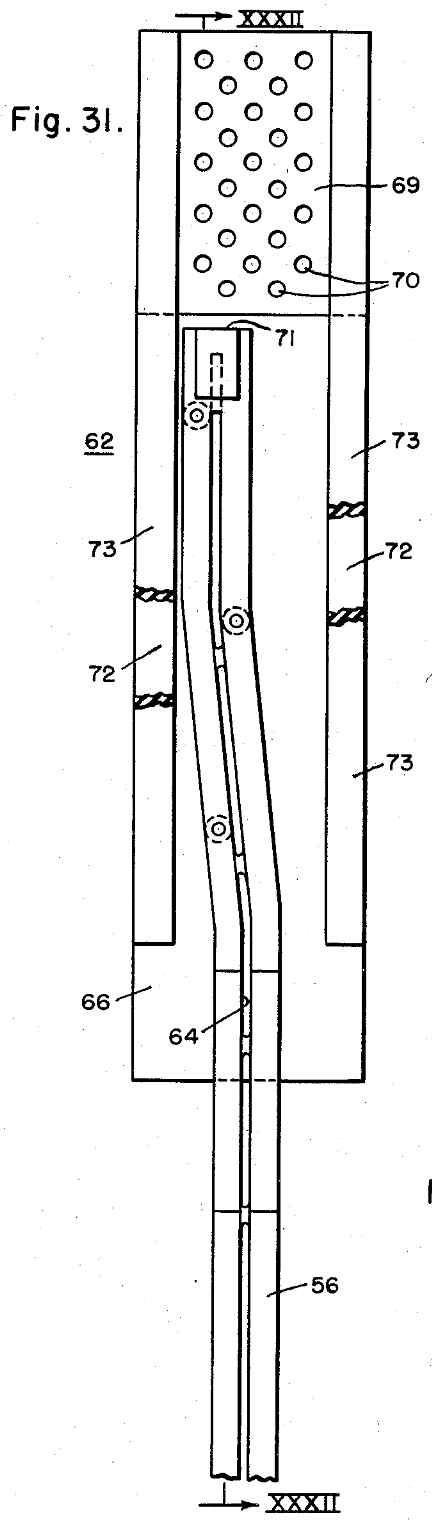
Fig. 31 is an end elevational view of the outer arc-horn assembly of the arc chute of Fig. 1, drawn to an enlarged scale.

There is provided a pair of arc-horn assemblies 62, 63 associated respectively with the front arc horn 56 and with the rear arc horn 67. As more clearly illustrated in Figs. 31–33, the front arc horn 56 is slotted, having a slot 64 therein, and is secured in spaced relation, by tubular spacing sleeves 65, to an upstanding, ceramic, channel-shaped support member 66. Not only does the channel-shaped, ceramic member 66 support the arc horn 56, but the side walls 67 thereof (Fig. 32) support asbestos-rope sections 68, which in turn support a perforated asbestos splitter plate 69, having holes 70 therein, immediately above the upper end 71 of the arcing horn 56. Below the perforated asbestos plate 69 is a pair of spacing strips 72 (Fig. 31), the same thickness as the asbestos plate 69; and on top of the strips 72, and extending over the asbestos splitter plate 69, is a further pair of spacing strips 73 (Fig. 31). The functioning of the perforated asbestos splitter plate 69 is described and claimed in United States Patent No. 2,442,199, issued May 25, 1948, to Robert C. Dickinson and Russell E. Frank, and assigned to the assignee of the instant application.

The rear arc horn 57, as shown in Fig. 1, is of a similar split construction, and has associated therewith a similar channel-shaped ceramic member 66, as illustrated in Fig. 31.

Figure 16:
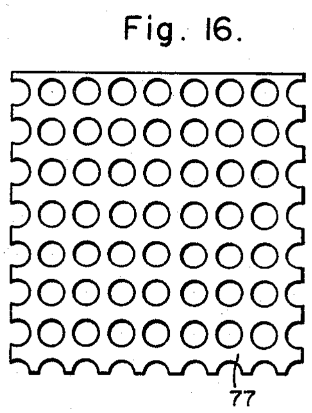
Fig. 16 is a plan view of the mesh screening employed in the coolers over the arc-horn assemblies.

It has been found that during the interruption of heavy fault currents, when the amount of ionized gas is considerable, that flashover externally of the exhaust end of the arc chute 10 is a distinct possibility; and to avoid this, there is associated with each arc-horn assembly 62, 63 a cooling baffle assembly, generally designated by the reference numeral 74. Each cooling baffle assembly 74 is constructed from a pair of grooved, side insulating support plates 75, more clearly shown in Figs 28 and 29 of the drawings. With reference to these figures, it will be noted that a plurality of spaced grooves 76 are provided in the support plates 75, which serve to support, and retain, a plurality, in this particular instance 16, perforated, mesh brass screens 77, more clearly shown in Fig. 16 of the drawings. During the assembly process the several mesh screens 77 are positioned within the grooves 76 of the support plates 75, and are retained therein by additional holding strips 78 (Fig. 2), which are secured by bolts 79 within holes 80 (Fig. 29), provided at the sides of the grooved support plates 75. The support plates 75 are secured by bolts to the side housing plates 36 passing through mounting holes 81 (Fig. 22) therein.

The cooling baffle assembly 74 not only comprises the aforementioned several mesh screens 77, but also includes an insulating deflecting angle 82, more clearly shown in Figs. 25 and 26 of the drawings, which is cemented, in a manner hereinafter described, to the upper end of the main stack portion 12, in a manner illustrated in Fig. 23. Thus, any exhaust gases, which are ionized, and which might be conducive to electrical flashover across the arc chute 10, or between adjacent phases, will be cooled upon passage through the stacked, mesh screens 77, and will be deflected outwardly, substantially at right angles to the exhaust direction, by the horizontally extending portion 83 of the insulating deflecting angle 82.

There is provided a cooling baffle assembly 74 at the upper end of such arcing-horn assembly 62, 63, so that at the ends of the arc chute 10 the exhaust gases are directed outwardly in substantially opposite directions.

In addition to the aforementioned cooling baffle assemblies 74, there are also provided several chimney extension structures 22, heretofore mentioned, and which will now be described. Each chimney extension 22, for the particular rating considered, namely an interrupter capable of interrupting 750,000 kva. at 13.8 kv., extends the enlarged chimney passages, or vent passages 20 approximately six inches above the top of the main stack structure 12.

Figures 4, 5, 6, 7:
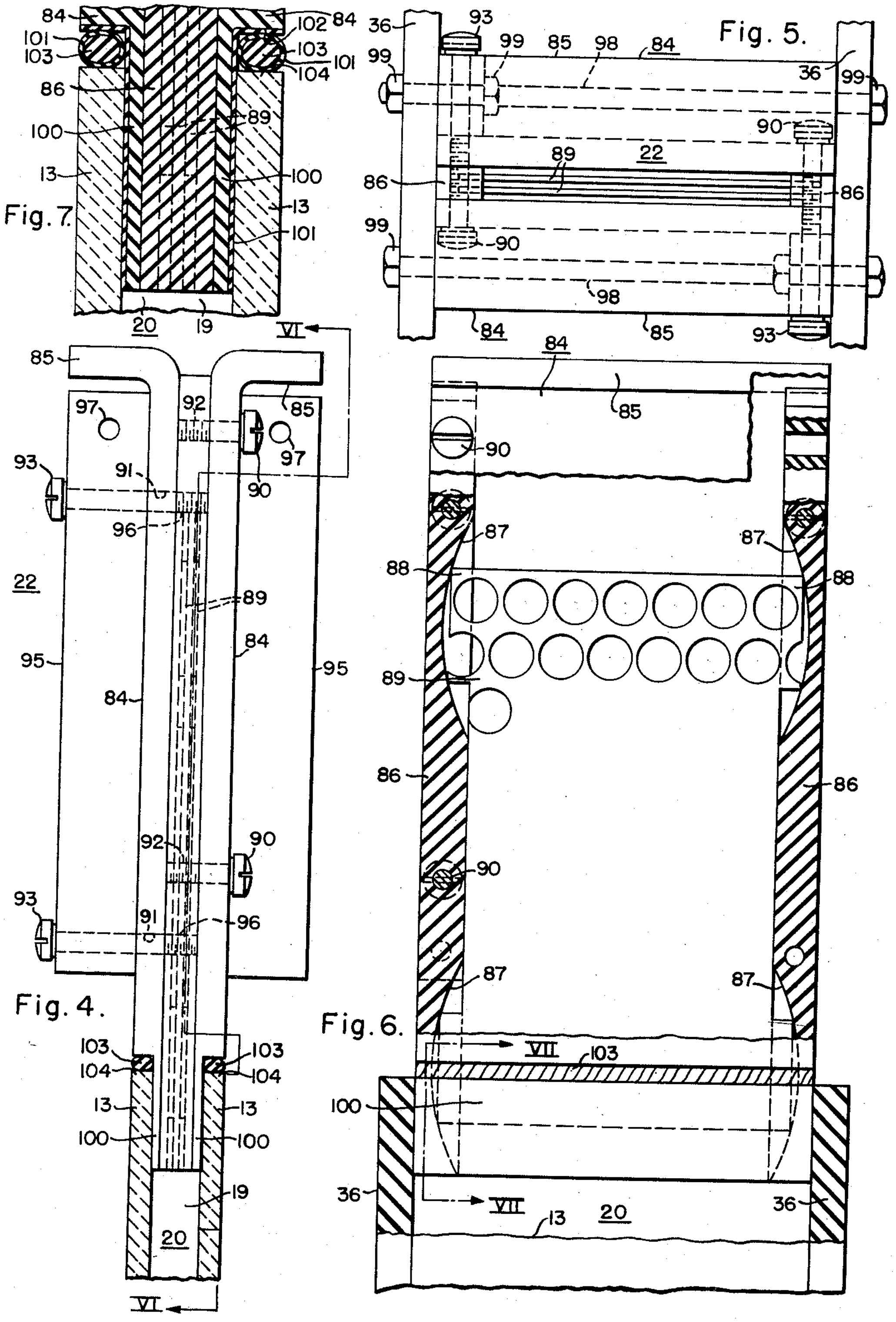
Fig. 4 is an enlarged, fragmentary side elevational view of one of the chimney extensions and the deflecting means associated therewith.
Fig. 5 is a fragmentary, top plan view of the chimney extension of Fig. 4.
Fig. 6 is an end elevational view, partially in section, of one of the chimney extensions, taken substantially along the line VI—VI of Fig. 4.
Fig. 7 is a fragmentary, vertical sectional view taken along the line VII—VII of Fig. 6.
Figures 8, 9, 10, 11, 12, 13, 14:
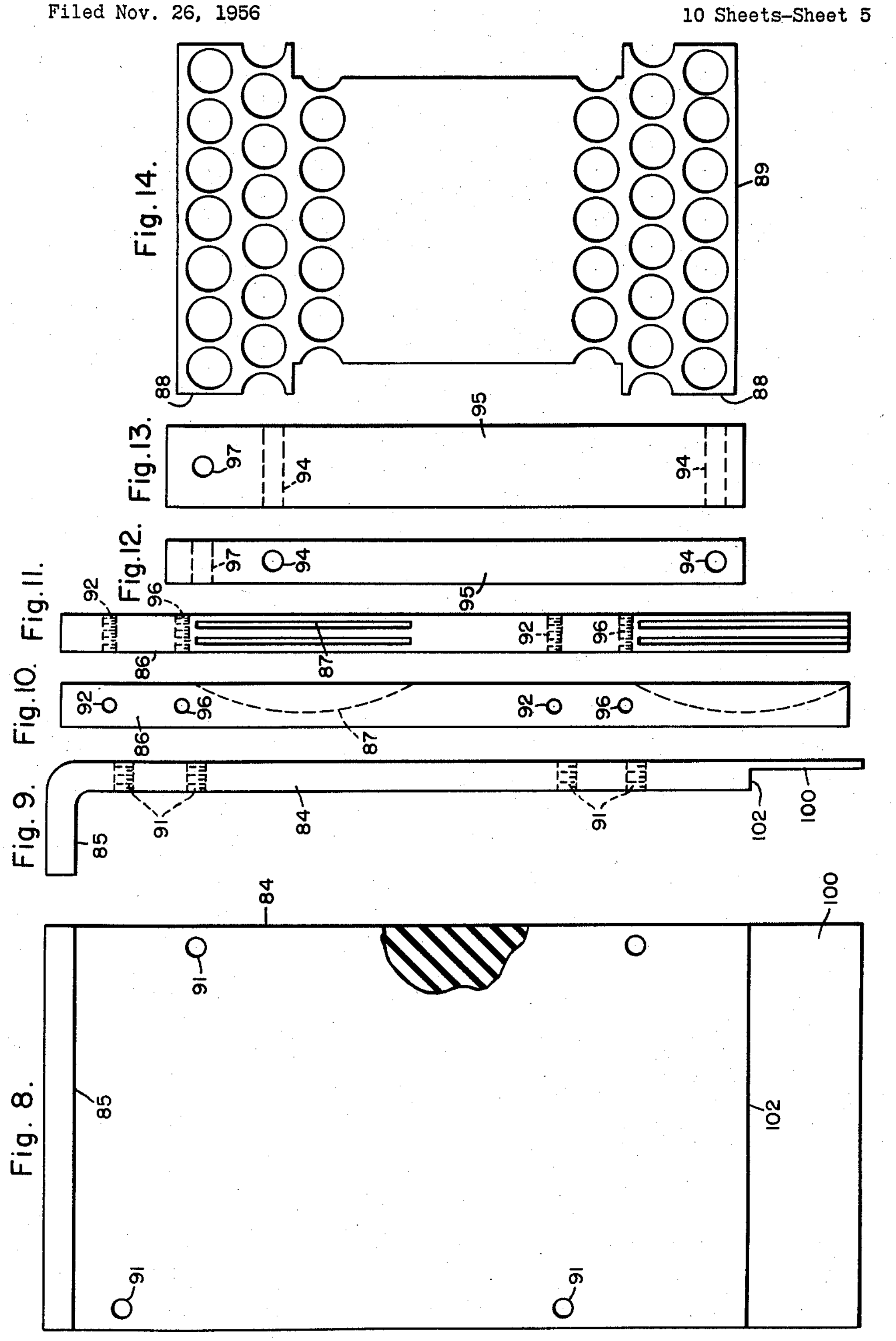
Fig. 8 is an end elevational view of one of the deflecting angles utilized in the chimney extension of Fig. 4.
Fig. 9 is a side elevational view of the deflecting angle of Fig. 8.
Fig. 10 is an end elevational view of one of the spacing strips used in the chimney extension of Fig. 4.
Fig. 11 is a side elevational view of the spacing strip of Fig. 10.
Fig. 12 is a side view of one of the mounting strips for the chimney extension of Fig. 4.
Fig. 13 is an end elevational view of the mounting strip of Fig. 12.
Fig. 14 is a plan view of the mesh screen used in the chimney extension of Fig. 4.

Each chimney extension structure 22 includes a pair of insulating deflecting angles 84, more clearly shown in Figs. 8 and 9 of the drawings. As illustrated in Fig. 4, two such deflecting angles 84 are faced in opposite directions, that is, having horizontally deflecting portions 85 directed oppositely, and between the two deflecting angles 84 is positioned a pair of insulating spacing strips 86 having a configuration more clearly shown in Figs. 10 and 11 of the drawings. With reference to Fig. 11, it will be observed that each insulating spacing strip 86 has pairs of grooves 87 machined therein, into which extend lug portions 88 integrally formed with a substantially rectangularly-shaped, mesh screen baffle 89, more clearly shown in Fig. 14 of the drawings.

Thus, during the assembly of the chimney extension structure 22, the mesh screens 89, preferably made from bronze, are inserted into the grooves 87 of the spacing strips 86, with the latter spacing the deflecting angles 84 apart. Bolts 90 (Fig. 4) extend through holes 91 in the deflecting angles 84 and are threadedly secured into tapped holes 92 in the spacing strips 86. Additional longer bolts 93 (Fig. 4) extend through holes 94 in the mounting strips 95, and extend through the holes 91 of deflecting angle 84, being threadedly terminated within additional tapped holes 96, provided in the insulating spacing strips 86.

The mounting strips 95 are provided with mounting holes 97, through which elongated studs 98 (Fig. 5) extend, and together with nuts 99 secure the chimney extension 22 to the inner side walls of the housing side plates 36.

It has been found to be very important to obtain a gas-tight seal between the chimney extension 22 and the upper end of the main spaced-plate stack structure 12. Unless such a gas-tight seal is obtained, there is a possibility of exhaust gas leakage, which will be partly ionized, and flashover across the outer end of the stack structures 12 may result.

Prior practice has been to machine a V-shaped groove at the lower end of deflecting angles, similar to the angles 84, but having merely blunt lower ends. Cement was placed in the V-shaped grooves, asbestos rope cemented therein, and the deflecting angles cemented to the outer ends of the plates 13 of the main stack structure 12. This was found to result in an ineffective seal for the very high ratings, such as 750,000 kva. It was discovered that if each deflecting angle 84 had its lower end machined to a thin strip 100, as shown in Fig. 9, and then the surface of the thin strip 100 was covered with cement, and cemented to the upper ends of adjacent plates 13 in a manner shown in Fig. 7, that greatly improved results were obtained. In addition to the cement 101 between the outer faces of the strips 100 and the upper side surfaces of the plates 13, there is also cemented along the shoulder portion 102 of each deflecting angle 84 an asbestos rope section 103, again more clearly shown in Fig. 7. This asbestos rope section 103 is shown as secured by cement 101, not only to the shoulder portion 102 of the deflecting angle 84, but also to the upper extremity 104 of the insulating plate 13.

As a result of the above construction, a firm, gas-tight seal is obtained between the chimney extension structure 22 and the outer end of the widened exhaust passage 20. The chimney extension 22, which may be approximately six inches above the chute stack 12, for example, renders the widened exhaust passages 20 more effective, increasing the flue effect, and, in addition, the deflecting angles 84 insure a deconcentration of the ionized exhaust gases. As a result, flashover across the outer end of the arc chute 10 is not possible.

It was mentioned heretofore that the deflecting angle 82 (Fig. 25) was cemented to one end of the main stack 12, as illustrated in Figs. 1 and 23. Again the deflecting angle 82 has a shoulder portion 105 machined thereon, and an asbestos rope section 103 is cemented to the upper end of the first long plate 13 of the stack 12, as shown in the relatively enlarged view of Fig. 23. Although this view shows the asbestos strip 103, it does not show the cement 101, and reference may be had to Fig. 7 for illustration of the cementing construction.

Figure 15:
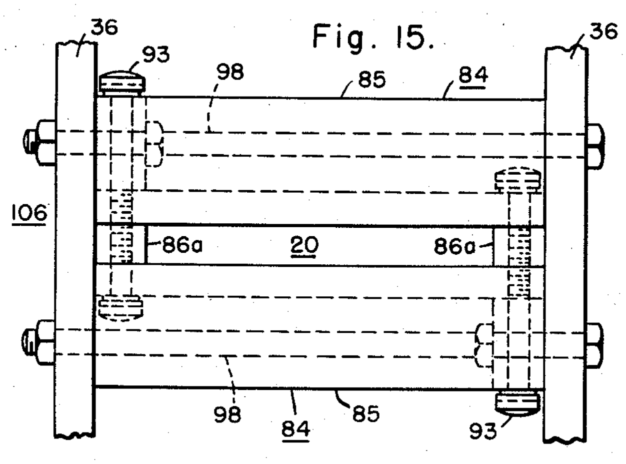
Fig. 15 is a top plan view of a modified chimney extension, in which the mesh screening is omitted.

It has been found that for certain lower ratings, the mesh baffle 89 is not necessary, and Fig. 15 shows a modified type of chimney extension structure 106, which is identical to the chimney extension structure 22, but the modified spacing strips *86a* do not contain cut grooves 87, and the mesh screening 89 is omitted.

Figure 17:
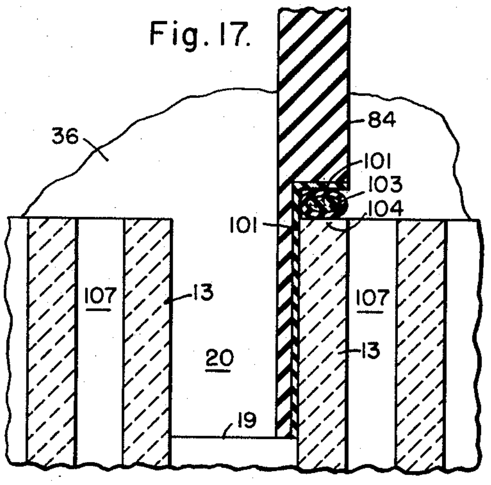
Fig. 17 illustrates a modified construction in which a single deflecting angle may be cemented along one side of a widened chimney passage in a spaced-plate arc chute.
Figure 18:
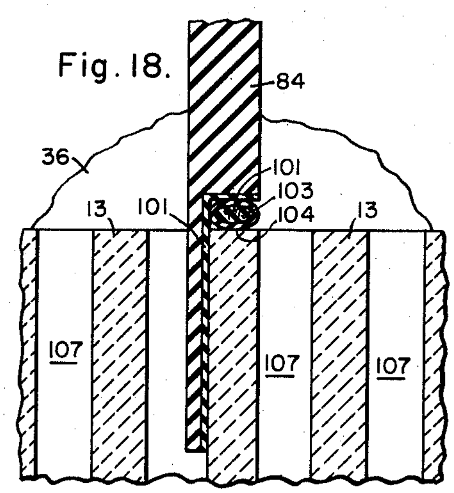
Fig. 18 is a view, somewhat similar to Fig. 17, showing a modified type of construction, in which a single deflecting angle may be sealed, by an improved manner, to the end of one of several, uniformly-spaced, arc-chute plates.

For certain applications it may be desirable, in order to prevent flashover across the outer end of an arc-chute stack, to provide a single insulating deflecting angle 84, either with a widened exhaust passage 20, or without such a widened exhaust passage, and Figs. 17 and 18 illustrate such constructions. Again it is very important to obtain a gas-tight seal between the deflecting angles 84 and the extremities 104 of the plates 13. Fig. 17 shows a cemented construction, identical to that of Fig. 7 where a widened chimney passage 20 is provided. Fig. 18, on the other hand, shows a cemented construction wherein the ceramic plates 13 are all spaced the same distance apart, forming venting passages 107 all of approximately the same width. In either case, a gas-tight seal results, with the elimination of any possibility of external flashover across the outer end of the arc-chute stack.

As a result of employing several of the widened exhaust passages 20 in each main stack structure 12, cooling baffle structures 74 above the arc-horn assemblies 62, 63, and as a result of the utilization of additional chimney deflecting structures 22, constituting additional extensions of the widened passages 20, a greatly improved arc-chute structure 10 results, which has been tested to 908,000 kva. at 13.2 kv. and over a 1,000,000 kva. at 18 kv. By the use of such features, together with a stronger magnetic circuit, an arc-chute has been manufactured which has a 50% higher interrupting capacity than former arc-chute structures of the same general type, and, at the same time, the arc-chute structure of the present invention utilizes four less ceramic plates in the main interrupter stacks 12 than former arc-chutes, which had the lower interrupting capacity.

Figure 38:
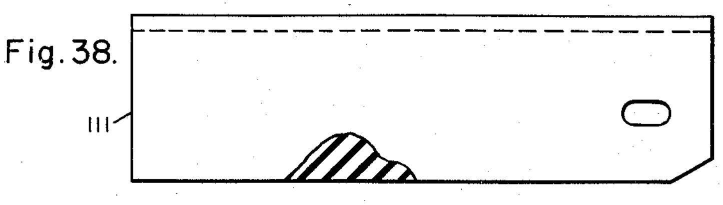
Figure 39:
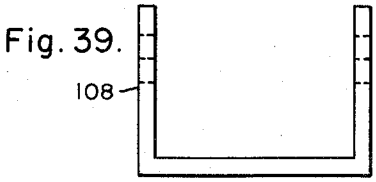

Another important feature of the invention is the use of two housing side plates 36, formed of insulating material, and having a configuration shown in Fig. 22, together with interposed insulating channel members, shown in Figs. 36–39 of the drawings. More particularly, with reference to Fig. 1, it will be noted that a front insulating channel member 108, more clearly shown in Figs. 37 and 39 of the drawings, is bolted by bolts 109 between the front edges of the side plates 36. An additional insulating channel 110, more clearly shown in Fig. 36, is bolted by bolts 109 between the rear edges of the side plates 36, and a relatively short insulating channel 111, shown in Fig. 38, is bolted between the lower edges of the side plates 36 in the manner illustrated in Fig. 1.

Prior construction was to utilize a substantially rectangularly-shaped housing jacket, which was fabricated by forming a special tube, which was first rolled and then formed to the required rectangular shape. The several component parts of the arc-chute were then inserted into the rectangular tube at the ends thereof. With the construction employed in the present invention, it is far easier and cheaper to assemble an arc-chute employing the two side plates 36 and the several insulating channels 108, 110 and 111. Not only is the fabrication time diminished, but also the several parts may be more cheaply manufactured, as compared to the relatively expensive operations involved in forming a rectangularly-shaped tube, as was done heretofore.

By placing the channels in a concave position with reference to the external periphery of the arc-chute box, and the fastening hardware placed at the extreme edges of the channel legs so that the bolts do not provide a conducting path through the walls, adequate creepage is maintained between external and inner live parts so that an electrical seal is unnecessary.

By way of recapitulation, in the assembly of the present improved interrupter, first a pole plate 31 (Fig. 34) is placed upon a flat surface with the yoke 34 bolted thereto by bolts 35. The core 34 has been wrapped with an overlapping turn of heavy insulating paper. A side plate 36 (Fig. 22) is placed over the core 34, with the core 34 protruding through the rectangularly-shaped opening 38 of the side plate 36. A center coil 37 (Fig. 35) is then placed over the core 34 fitting within the opening 38 of the side plate 36. Then comes the coil washer 39 (Fig. 19), the two center arc horns 47, the other coil washer 39 with the shading coil 44 (Fig. 27) placed over the core 34. The terminals of the center coils 37 are then bolted, and the two transfer stacks 23 inserted between the outer faces 54 of the shading coil 44 and the inner surfaces 59 of the center arc horns 47.

The wedge-shaped arc shield 61 is bolted by bolts 112 (Fig. 3) to the lower side plate 36, so that the transfer stacks 23 rest in the recesses 60, shown in Fig. 1. The arc horn assemblies 62, 63 are then bolted into place, and the main stacks 12 placed in position. The deflecting baffle assemblies 74 are assembled, and placed into position. The upper side plate 36, together with its bolted arc plate 61, is then placed over the above assemblage of parts, so that its opening 38 encloses the upper center coil 37, and the upper pole plate 31 is then placed into position, and bolted, by bolts 35, to the interposed core 34.

Figure 2:
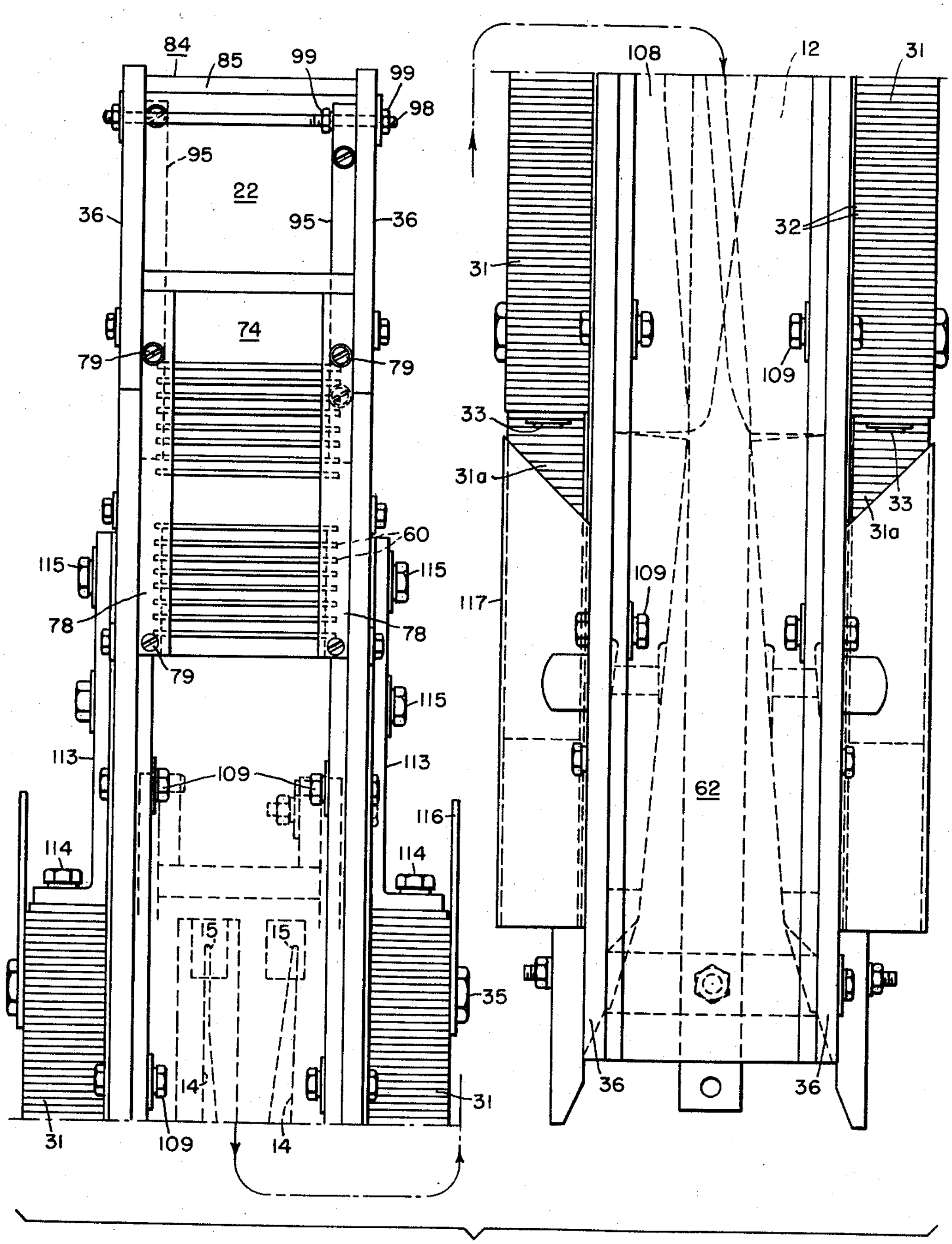
Fig. 2 is an enlarged, end elevational view looking toward the front of the arc chute of Fig. 1.

To take the weight of the magnet structure 30 off of the two center coils 37, a pair of insulating angle supports 113 (Figs. 1 and 2) are bolted by bolts 114 to the upper sides of the pole plates 31, and are also bolted, by bolts 115, to the upper sides of the side plates 36. Lifting lugs 116, used for lifting the arc-chute 10, may be disposed under the heads of the bolts 35, as shown in Fig. 2. Rectangularly-shaped insulating boots 117 may be forced over the depending portions 31$a$ of the side pole plates 31. Because of the relative size of the circuit interrupter 1, involving a number of separate parts, each of which individually is quite heavy for a workman to assemble, it is a distinct advantage, in the assembly operation, to assemble the structure in the manner heretofore described, beginning with one side plate 36, and building up the structure in the aforesaid manner. As a final step of the assembly process the chimney extension structures 22, which have separately been individually assembled, are inserted between the two side plates 36, and bolted to the upper ends thereof by the mounting studs 98, the cementing operation having transpired prior to the insertion of the relatively thin strips 100 (Fig. 9) into the widened chimney passages 20, as shown in Fig. 1.

During the opening operation, the contact structure 2 separates, drawing an arc 9, which is moved upwardly by at least three separate forces. One is the loop effect, caused by the two terminal studs and the rotatable contact arm 11. The second effect is the thermal effect caused by the hot gases tending to carry the arc 9 upwardly between the wedge-shaped fire plates 61, and the third effect is the magnetic effect caused by the presence of the depending portions 31$a$ of the side pole plates 31, as set out in United States Patent 2,616,007, issued October 28, 1952, to Robert C. Dickinson and Russell E. Frink, and assigned to the assignee of the instant invention.

The arc 9 is broken up into three portions 55$a$, 55$b$ and 55$c$, as heretofore mentioned, with the lower end 58 of the shading coil 44 subdividing the intermediate arc portion 55$b$ into two portions 55$b_1$ and 55$b_2$. The transfer stack sections 23 rapidly effect the extinction of the arc portions 55$b_1$ and 55$b_2$, thereby energizing the two serially related center coils 37, which, in turn, set up a magnetic flux in the magnet structure 30.

This will cause a transverse magnetic flux between the pole plates 31 across the main stacks 12, forcing the arc portions 55$a$ and 55$b$ upwardly through the slots 14 of the several plates 13. At the upper closed ends 15 of the slots 14, the arc portions 55$a$ and 55$c$ will be halted. Ionized gas from the arc portions 55$a$ and 55$c$ will be forced by the transverse magnetic field up through the relatively narrow vent passages 107 between the plates 13, which will, in turn, cause an upward blast of unionized gas into the arc streams from below. The presence of the widened exhaust passages 20, and their additional extensions, as caused by the chimney extensions 22, will insure a stabilizing effect of the arc column at these points, and, in addition, will bring about a greater exhausting effect at these points, thus causing every plate 13 of the main stacks 12 to exert its individual interrupting influence upon the arcs 55$a$ and 55$c$.

Arc extinction quickly follows, with the cooling baffle structure 74 cooling the ionized exhaust gases at the upper ends of the arc horn assemblies 62, 63, and deflecting the exhaust gases in opposite directions, as indicated in Fig. 1.

The chimney extension structures 22 not only assist in cooling the ionized exhaust gases passing upwardly through the widened exhaust passages 20 by virtue of the mesh screening 89, but also disseminate the ionized exhaust gases, preventing their concentration, and eliminating the possibility of external flashover. Thus, the arc-chute structure 10, as a whole, quickly brings about arc extinction, and insures that once the circuit is interrupted there will be no reignition possible brought about by any external flashover.

From the foregoing description of the invention, it will be apparent that a greatly improved arc-chute structure has been developed, which has been found to be capable of interrupting high powers in the range that heretofore could be interrupted only by the use of oil circuit breakers or compressed air. The present interrupter has the advantage of being a magnetic air interrupter, requiring no change of oil, and not involving a fire hazard. To a considerable extent, it supersedes oil circuit breakers in a considerable power range, and hence may advantageously be used in industrial areas where oil cannot be tolerated, and where numerous personnel may be present.

Although certain features of the invention have particular applicability to magnetic air circuit interrupters, certain features of the invention are applicable to other types of interrupters, operating in mediums other than air, and it is desired that these additional features be given wide scope.

Although there has been shown and described specific structures it is to be clearly understood that the same were merely for the purpose of illustration, and that changes and modifications may readily be made therein, by those skilled in the art, without departing from the spirit and scope of the invention.

We claim as our invention:

1. A circuit interrupter including means for establishing an arc, an arc-chute for extinguishing the arc including a number of sections of substantially parallel disposed, spaced, insulating plate portions having normal relatively narrow venting passages therebetween, said plate portions being positioned substantially transversely of the established arc, each section having at least several plate portions with normal relatively close spacing between the plate portions, and a plurality of widened exhaust passages spaced at intervals along the length of the arc-chute between said sections, each of which has a greater venting capacity than the venting capacity of the normal relatively narrow venting passages between the spaced plate portions.

2. The combination in a circuit interrupter of contact means for drawing an arc, means defining an arc-chute within which said arc is moved including a number of sections each including spaced, slotted insulating plate portions, each section having at least several plate portions with normal relatively close spacing between the plate portions, said arc moving into the slots of said spaced plate portions substantially transversely of said plate portions, the normal spacing between said plate portions providing a number of normal relatively narrow venting passages therebetween for the exhaust of arc gases away from the arc, and a plurality of widened exhaust passages spaced at intervals along the length of the arc-chute between said sections, each of which has a greater venting capacity than the venting capacity of the normal relatively narrow venting passages between the spaced plate portions.

3. A circuit interrupter including an arc-chute having several plate sections each including a number of spaced, insulating, plate portions having normal relatively narrow venting passages therebetween, each plate portion having a tapered closed slot therein, the several closed slots of the plate portions being substantially aligned to provide thereby a tapered arc passage, each section having at least several plate portions with normal relatively close spacing between the plate portions, contact means for establishing an arc substantially transversely of said plate portions, means for moving said established arc into said tapered arc passage and against the closed ends of the slots associated with said plate portions, and a plurality of widened exhaust passages between said sections spaced at intervals along the length of the arc-chute, each of which has a greater venting capacity than the venting capacity of the normal relatively narrow venting passages between the spaced plate portions.

4. A circuit interrupter including means for establishing an arc, an arc-chute for extinguishing the arc including a number of sections of substantially parallel disposed, spaced, insulating plate portions having normal relatively narrow venting passages therebetween, said plate portions being positioned substantially transversely of the established arc, each section having at least several plate portions with normal relatively close spacing between the plate portions, a plurality of widened exhaust passages spaced at intervals along the length of the arc-chute between said sections, each of which has a greater venting capacity than the venting capacity of the normal relatively narrow venting passages between the spaced plate portions, and means defining a widened chimney extension for one or more of said widened exhaust passages which extends beyond the outer ends of the insulating plate portions.

5. A circuit interrupter including means for establishing an arc, an arc-chute for extinguishing the arc including a number of substantially parallel disposed, spaced, insulating plate portions having venting passages therebetween, said plate portions being positioned substantially transversely of the established arc, and a plurality of widened exhaust passages spaced at intervals along the length of the arc-chute, each of which has a greater venting capacity than the venting capacity of the normal venting passages between the spaced plate portions, means defining a widened chimney extension for one or more of said widened exhaust passages which extends beyond the outer ends of the insulating plate portions, and one or more cooling screens disposed within one or more of said chimney extensions.

6. A circuit interrupter including means for establishing an arc, an arc-chute for extinguishing the arc including a number of sections of substantially parallel disposed, spaced, insulating plate portions having normal relatively narrow venting passages therebetween, said plate portions being positioned substantially transversely of the established arc, each section having at least several plate portions with normal relatively close spacing between the plate portions, a plurality of widened exhaust passages spaced at intervals along the length of the arc-chute between said sections, each of which has a greater venting capacity than the venting capacity of the normal relatively narrow venting passages between the spaced plate portions, means defining a widened chimney extension for one or more of said widened exhaust passages which extends beyond the outer ends of the insulating plate portions, and each chimney extension including a pair of complementary insulating deflecting angles having the outer deflecting portions facing in the opposite direction.

7. A circuit interrupter including means for establishing an arc, an arc-chute for extinguishing the arc including a number of substantially parallel disposed, spaced, insulating plate portions having venting passages therebetween, said plate portions being positioned substantially transversely of the established arc, and a plurality of widened exhaust passages spaced at intervals along the length of the arc-chute, each of which has a greater venting capacity than the venting capacity of the normal venting passages between the spaced plate portions, means defining a widened chimney extension for one or more of said widened exhaust passages which extends beyond the outer ends of the insulating plate portions, one or more cooling screens disposed within one or more of said chimney extensions, and each chimney extension including a pair of complementary insulating deflecting angles having the outer deflecting portions facing in the opposite direction.

8. A circuit interrupter including means for establishing an arc, an arc-chute for extinguishing the arc including a plurality of insulating plate portions, means spacing at least some of said insulating plate portions a relatively small distance apart, an insulating extension plate, means for providing a gas-tight seal between said extension plate and one of the plate portions including a thin end of said extension plate cemented to the outer side surface of said one plate portion, and the shoulder associated with said thin end being adjacent the outer end of said one plate portion.

9. A circuit interrupter including means for establishing an arc, an arc-chute for extinguishing the arc including a plurality of insulating plate portions, means spacing at least some of said insulating plate portions a relatively small distance apart, an insulating extension plate, means for providing a gas-tight seal between said extension plate and one of the plate portions including a thin end of said extension plate cemented to the outer side surface of said one plate portion, the shoulder associated with said thin end being adjacent the outer end of said one plate portion, and an asbestos rope section cemented between the shoulder and the end of said one plate portion.

10. An arc-chute for a circuit interrupter including a stack of spaced insulating plates, one or more pairs of plates being spaced apart a greater distance than the normal spacing between the plates, a chimney extension for one of said pairs of plates including a pair of insulating deflecting members having thin ends at one end thereof with shoulder portions, and means for insuring a gas-tight seal between the chimney extension and the outer ends of said one pair of plates including a cemented seal between the thin ends of the deflecting members and the outer side surfaces of said one pair of plates with the shoulder portions of the deflecting members adjacent the outer ends of said one pair of plates.

11. A circuit interrupter including contact means for establishing an arc, one or more arc horn assemblies upon which at least one end of said established arc runs during the interrupting operation, an arc chute including a multiplicity of insulating plate portions disposed between arc-horn assemblies and providing exhaust passages between said plate portions, and a cooling baffle assembly disposed at the exhaust end of one arc horn assembly comprising a plurality of perforated, metallic, spaced cooling members disposed substantially perpendicularly to the end of said one arc horn assembly and said plate portions to cool the arc gases and prevent external flashover.

12. A circuit interrupter including means for establishing an arc, an arc-chute for extinguishing the arc including a number of substantially parallel disposed, spaced, insulating plate portions having venting passages therebetween, said plate portions being positioned substantially transversely of the established arc, a plurality of widened exhaust passages spaced at intervals along the length of the arc-chute, each of which has a greater venting capacity than the venting capacity of the normal venting passages between the spaced plate portions, and means defining a widened chimney extension for one or more of said widened exhaust passages which extends beyond the outer ends of the insulating plate portions, one or more arc horn assemblies upon which at least one end of said established arc runs during the interrupting operation, and a cooling baffle assembly disposed at the exhaust end of one arc horn assembly comprising a plurality of perforated, metallic, spaced cooling members disposed substantially perpendicularly to the end of said one arc horn assembly to cool the arc gases and prevent external flashover.

References Cited in the file of this patent

UNITED STATES PATENTS

| | | |
|---|---|---|
| 2,276,859 | Nau | Mar. 17, 1942 |
| 2,293,452 | Boehne | Aug. 18, 1942 |
| 2,442,199 | Dickinson et al. | May 25, 1948 |
| 2,477,189 | Lerstrup | July 26, 1949 |
| 2,611,058 | Rawlins | Sept. 16, 1952 |
| 2,632,074 | Herman | Mar. 17, 1953 |
| 2,652,469 | Weston | Sept. 15, 1953 |
| 2,734,970 | Spears | Feb. 14, 1956 |

FOREIGN PATENTS

| | | |
|---|---|---|
| 564,050 | Great Britain | Sept. 11, 1944 |
| 705,463 | Great Britain | Mar. 10, 1954 |